(12) United States Patent
Kast

(10) Patent No.: US 6,703,586 B1
(45) Date of Patent: Mar. 9, 2004

(54) LOCALIZATION OF HEATING OF A CONDUCTIVELY COATED WINDOW

(75) Inventor: Michael A. Kast, Palo Alto, CA (US)

(73) Assignee: Southwall Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/245,351

(22) Filed: Sep. 16, 2002

(51) Int. Cl.[7] .............................. H05B 3/00; H05B 3/26
(52) U.S. Cl. ...................... 219/203; 219/543; 219/522
(58) Field of Search ................................ 219/203, 522, 219/543, 541, 202; 338/306–309; 52/171.2; 392/432, 435, 436

(56) References Cited

U.S. PATENT DOCUMENTS

| | | | | |
|---|---|---|---|---|
| 2,557,983 A | * | 6/1951 | Linder ........................ | 219/522 |
| 2,877,329 A | * | 3/1959 | Gaiser ........................ | 219/543 |
| 2,878,357 A | * | 3/1959 | Thomson .................... | 219/203 |
| 3,302,002 A | * | 1/1967 | Warren ....................... | 219/543 |
| 3,313,920 A | * | 4/1967 | Gallez ........................ | 219/203 |
| 3,366,777 A | * | 1/1968 | Brittan et al. ............... | 219/203 |
| 3,475,588 A | * | 10/1969 | McMaster ................... | 219/203 |
| 3,982,092 A | * | 9/1976 | Marriott ..................... | 219/203 |
| 4,251,316 A | * | 2/1981 | Smallbone .................. | 427/123 |
| 4,910,380 A | * | 3/1990 | Reiss et al. ................. | 219/203 |
| 5,347,106 A | * | 9/1994 | Reiser et al. ............... | 219/219 |
| 5,466,911 A | | 11/1995 | Spagnoli et al. ............ | 219/203 |
| 5,798,499 A | * | 8/1998 | Shibata et al. .............. | 219/203 |
| 6,037,573 A | | 3/2000 | Arsenault et al. ........... | 219/492 |
| 6,163,013 A | | 12/2000 | King et al. .................. | 219/203 |
| 6,204,480 B1 | | 3/2001 | Woodard et al. ............ | 219/203 |
| 2003/0116551 A1 | * | 6/2003 | Sol et al. .................... | 219/203 |

FOREIGN PATENT DOCUMENTS

| | | | | |
|---|---|---|---|---|
| DE | 4302005 | * | 4/1995 | |
| GB | 2186769 | * | 8/1987 | ................. 219/203 |
| WO | 91/10564 | * | 7/1991 | |

* cited by examiner

Primary Examiner—John A. Jeffery
(74) Attorney, Agent, or Firm—Law Offices of Terry McHugh

(57) ABSTRACT

Localized heating of a window, such as a vehicle windshield or sidelight, is provided by dividing an optical coating that is electrically conductive into high and low heating zones. While the conductive coating covers substantially the entirety of the window, the coating is patterned to establish a preselected heating power density pattern. In one application, bus-to-bus dimensions are kept short and opposite polarity high heating zones are placed in a side-by-side relationship, so that the major portion of the window is left unheated and the bus connections may be placed along the same window edge. In another application, the bus-to-bus dimensions are significantly larger, but power concentration is provided by a pattern of isolation lines that narrow the dimensions of current flow through a zone in which heating is desired.

16 Claims, 5 Drawing Sheets

LOCALIZATION OF HEATING OF A CONDUCTIVELY COATED WINDOW

TECHNICAL FIELD

The invention relates generally to heating a window and more particularly to providing localized window heating that is sufficient for selective de-icing and defogging.

BACKGROUND ART

Single layer or multilayer coatings are often used to achieve desirable optical characteristics for windows used in vehicles, homes and buildings. For example, Southwall Technologies, Inc. sells a film under the federally registered trademark XIR, which is incorporated into a glass lamination to significantly reduce solar heat gain through the lamination when it is used as a window, such as an automobile windshield.

U.S. Pat. No. 6,204,480 to Woodard et al., which is assigned to the assignee of the present invention, describes the use of an optical coating on a vehicle window to heat the window for purposes of providing de-icing or defogging. The coating is a thin film stack that is electrically conductive, but is sufficiently thin to be substantially transparent. The term "transparent" is defined herein as the ability to transmit at least 30 percent of radiation within the visible range of the light spectrum. Electrical connections to the thin film conductive coating are provided by bus bars. The bus bars may be patterned to achieve desired current distribution or to focus heating into certain regions of the window. The patent identifies a variety of prior art techniques for attaching bus bars to conductive glass coatings. The known techniques include using conductive enamel frits or using a border of opaque ceramic material that is bonded to an interior surface of the window along its periphery. In comparison to the prior art techniques, Woodard et al. describes using vacuum deposition approaches to forming the bus connections. A multilayer conductive optical coating is sputter deposited onto automotive windows, such as windshields. Then, bus bars are sputtered onto opposing edges of the conductive coating. As an alternative, the sputter deposition occurs on a flexible plastic substrate, such as a thin polyethylenethereph-thalate (PET) substrate, with the coated substrate then being cut to size and applied to the windshield. The patent states that it is possible to vary the thickness of the bus bars, so that the conductivity of the connection of the coating is also varied. In this manner, the heat may be focused onto certain areas of the windshield.

A concern in designing electrical systems for automobiles, such as de-icing and defogging systems, is that the systems are practically restricted to the battery power capacity of the automobile, although higher voltages may be achieved at some expense. Conventional automobile batteries provide a maximum voltage of 14 volts DC. At this voltage level, most coatings for automobile and building windows have a sheet resistance that is too high to achieve useful heating with bus-to-bus dimensions that are typical of automobile windshields and sidelights, as well as typical home and building windows. It is for this reason that bus bars are sometimes shaped to focus the heating power. U.S. Pat. No. 5,466,911 to Spagnoli et al. describes a vehicle sidelight that takes advantage of the shape of the sidelight to concentrate the heating of the portion of the window through which an operator views an exterior rearview mirror. Since the sidelight has a decreasing top-to-bottom dimension as the sidelight approaches this portion, the shape of the window inherently concentrates the heating along this portion when the bus bars are properly positioned. In order to reduce undesirable heating of the window, a non-conductive break is formed within the conductive coating below the viewable portion of the sidelight. That is, while the entirety of the exposed portion of the sidelight is heated, the heating will fluctuate on the basis of the dimensions of the sidelight and the positions of the bus bars, while the unexposed portion of the sidelight is left unheated.

Rather than heating an entire window, a de-icing or defogging system may be limited to a particular area, so that a vehicle battery voltage will result in sufficient power. U.S. Pat. No. 6,037,573 to Arsenault et al. describes forming a heating layer only within the "park" region for windshield wipers. Thus, the system is able to free a wiper blade from ice. A similar system is described in U.S. Pat. No. 6,163,013 to King et al., but an electric heating grid is formed at the "park" region for the windshield wipers, rather than a solid heating layer.

While the known systems operate well for their intended purposes, what is needed is a method and system for directing heating to desired locations, while controlling the localization such that excessive current does not cause damage to the components of the system.

SUMMARY OF THE INVENTION

Heating of one or more regions of a window is provided by dividing an electrically conductive and substantially transparent coating into high and low heating zones. The coating, which covers substantially the entirety of the window portion that is exposed to a viewer, is patterned to establish a preselected heating power density pattern. Power connections are then coupled to the coating such that electrical current is induced to flow through each high heating zone. In the preferred embodiment, the window is a motor vehicle window.

The heating power density pattern may be established by forming isolation traces within the transparent conductive coating. The isolation traces may merely be scribe lines from which coating material has been scratched, but more sophisticated techniques are preferred, such as the use of laser ablation or the use of localized heating/electric discharge. Since the coating is transparent, the isolation traces are largely invisible, typically only being seen in reflection.

In one application, the isolation traces are formed along a bottom of a windshield, so that the area or areas in which the windshield wipers reside is heatable. The isolation traces define a series of high-current regions along the bottom of the windshield, while the remainder of the windshield is at zero or near zero voltage. The isolation traces may be upwardly extending non-conductive lines that separate negative voltage regions from positive voltage regions. An alternating pattern of negative and positive voltage regions is preferred, but other patterns may be formed. A power source, such as a vehicle battery, is appropriately coupled to the negative voltage and positive voltage regions. For example, bus bars may be formed below the regions, effectively screening the bus bars from the view of an occupant of the vehicle.

In another application, the current flow within the heating power density pattern is not restricted to a small portion of the window. For example, a high heating zone may be substantially surrounded by low heating zones of the window, such as would be beneficial in regionally de-icing or defogging a vehicle sidelight (i.e., side window) to enable viewing of a side-mounted rearview mirror. The isolation traces within the transparent conductive coating may be located to focus current flow through a high heating zone that is aligned with the rearview mirror. A bus bar having a positive polarity is connected to one low heating zone in a position that is preferably below the window sightline for an occupant of the vehicle. Similarly, a negative polarity bus bar is connected to a second low heating zone that is preferably located below the window sightline. In order for current to flow between the two bus bars, the current must pass through the high heating zone. The coatings are identical for the low and high heating zones, but the dimensions of the high heating zone establish a high power density through the zone.

A concern is that simple terminations of the isolation traces will result in excessive current at the trace ends. The excessive current may cause damage to the coating, which is intended to provide optical benefits such as solar screening. One approach to reducing the undesired power concentration at the trace ends is to place an additional conductive element at or near the trace ends. For example, an added wire may be formed along the coating perpendicular to the ends of the isolation traces. In the application in which windshield wiper de-icing is provided, the wire may be formed horizontally along the tops of the isolation traces that separate the positive voltage regions from the negative voltage regions. Another approach to reducing the likelihood that current will cause coating and/or substrate damage is to increase the average electrical resistance at the ends of the isolation traces. For example, the coating may be patterned to include areas that require multiple current paths around the ends of the isolation traces. This may be accomplished by spot removals of coating material at the trace ends. Moreover, the trace ends may be radiused.

An advantage of the invention is that it utilizes preexisting coatings to enable selective zone heating of a window. Zones close to a laminated window edge may be electrically heated using conductive transparent thin films with minimal heating impact in other areas of the laminate. Opposite polarity bus connections may be formed adjacent to each other, and may even be attached on the same edge of the laminate.

DETAILED DESCRIPTION

Figure 1:
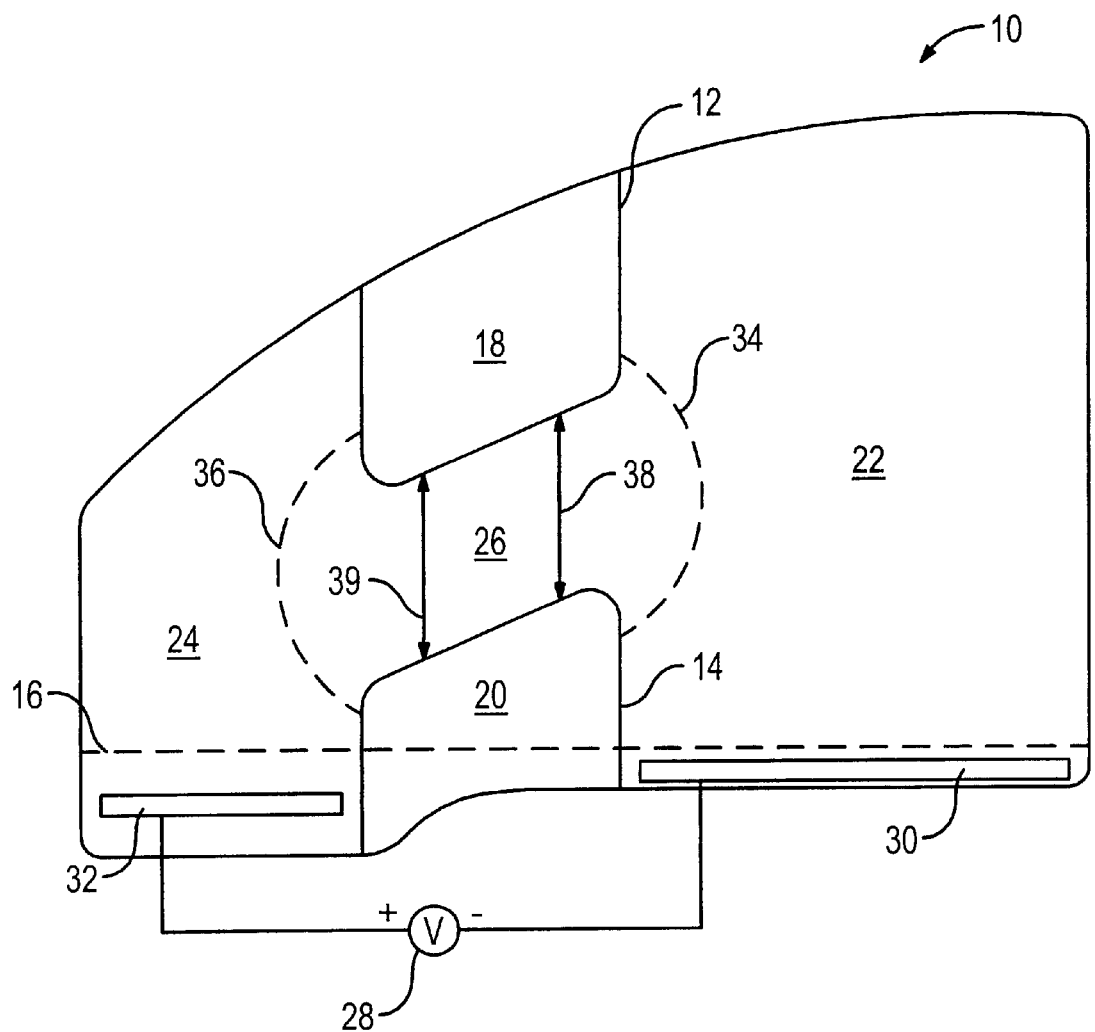
FIG. 1 is a two-dimensional view of a vehicle sidelight having an optical coating that has been patterned to establish a preselected heating power density pattern in accordance with one embodiment of the invention.

With reference to FIG. 1, a vehicle window 10 having an optical coating is shown as being patterned in accordance with the invention. The optical coating may be applied directly to the glass or may be formed on a substrate, such as a PET substrate, that is then applied to the glass. That is, when references are made to a coated window or to a coating on a window, the references should not be interpreted to be limiting with regard to the fabrication or assembly approach or techniques in providing the laminate. As another alternative, the window is formed of a transparent member other than glass, such as a transparent rigid plastic window. The optical coating may be a solar control coating, such as the one sold by Southwall Technologies, Inc. under the federally registered trademark XIR. However, other types of electrically conductive coatings may be modified in the manner that will be described with reference to FIG. 1.

Isolation traces 12 and 14 are formed in the optical coating on the window. The isolation traces are high resistance lines that divide the coating into various zones. In the particular application shown in FIG. 1, the portion of the window above a sightline 16 is divided into a pair of no heating zones 18 and 20, a pair of low heating zones 22 and 24, and a single high heating zone 26.

A power source 28, such as a car battery, has a negative terminal coupled to a negative bus connection 30 and has a positive terminal coupled to a positive bus connection 32. As shown in FIG. 1, the bus connections are below the sightline 16 of the window 10, so that the buses are not visible to an occupant of the vehicle to which the window is mounted. The bus connections may be frits and the interface of the coating to the bus connections may be formed with silver sputtered film. However, the process of connecting the power source 28 is not critical to the invention.

The isolation traces 12 and 14 are areas of very high electrical resistance. Preferably, the traces form an electrically open condition, but should at least define high resistance areas compared to the average sheet resistance of the optically coated window 10. The isolation traces may be mechanically, thermally, optically, and/or electrically formed. For example, the traces may be mechanically formed by manually removing material, such as by a scribe. On the other hand, laser ablation may be used. As another approach, laboratory grade electric scribing techniques may be used to provide scribed lines that serve as high electrical resistance paths that shunt current along desired routes. In the particular application shown in FIG. 1, the isolation trace 14 is formed to prevent current flow between the negative and positive bus connections 30 and 32, except through the high heating zone 26. Thus, current flow between the negative bus connection 30 and the positive bus connection 32 is through the low heating zone 22, to the high heating zone 26, and then through the second low heating zone 24. For situations as described above in which the interface of the coating to the bus connections is with silver sputtered film, the interface film may need to be scribed multiple times (e.g., four times) to ensure that bus power is isolated other than through the high heating zone.

The desired heating level for practical de-icing or defogging applications is on the order of 5 to 10 W/dm$^2$. Thus, if the resistance of the first low heating zone 22 is $R_1$, the resistance of the high heating zone 26 is $R_2$, and the resistance of the second low heating zone 24 is $R_3$, then it is preferred that the resistances establish the condition in which $R_2 > R_1 + R_3$. The zone of interest for de-icing to allow mirror viewing is bordered by the dashed lines 34 and 36 and the central portions of the isolation traces 12 and 14. While not critical, there are benefits to maintaining an equal cross sectional dimension through the high heating zone 26, as represented by the equal length arrowed lines 38 and 39.

Figure 2:
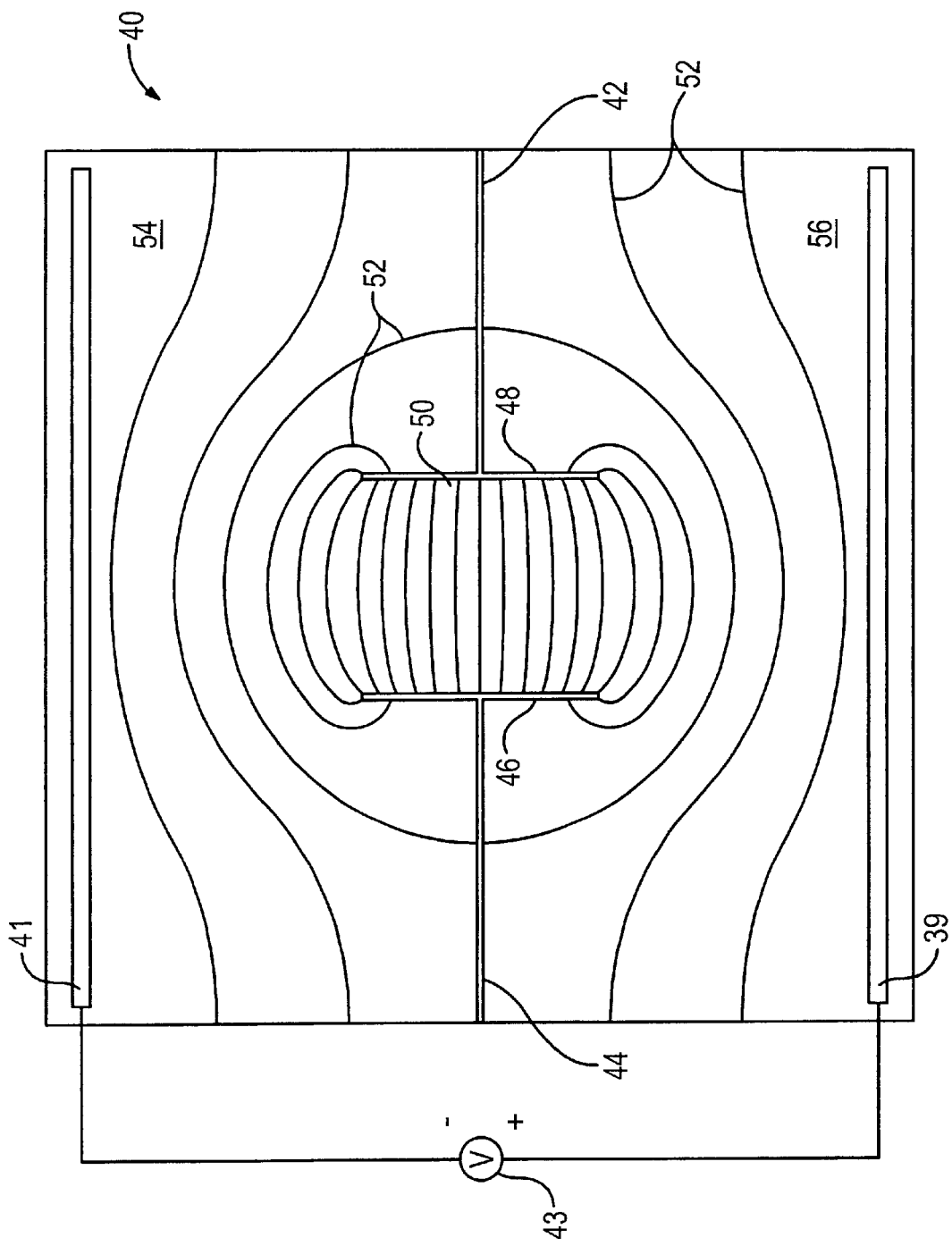
FIG. 2 is a two-dimensional view of a coated window having isolation traces that establish a desired heating power density pattern, with lines of equipotential being shown for purposes of understanding.

In the embodiment of FIG. 2, the bus connections 39 and 41 are at the bottom and top of the window 40 having the electrically conductive coating. The bus connections are coupled to the coating and to a voltage source, such as a battery 43. The coating covers the glass, other than along a pair of horizontal isolation traces 42 and 44 and a pair of vertical isolation traces 46 and 48. Between the two vertical isolation traces is the high heating zone. For current to flow between the top-mounted bus connection and the bottom-mounted bus connection, the current must pass through the relatively narrow high heating zone 50 between the vertical isolation traces. Since this passage is relatively narrow, the heating power density pattern exhibits a focused heating within the zone 50. This is apparent from the density of lines of isopotential 52 in FIG. 2. As in FIG. 1, the sheet resistance ($R_2$) within the high heating zone is preferably less than the sum of the sheet resistances ($R_1+R_3$) of the low heating zones 54 and 56 on the opposite sides of the horizontal isolation traces 42 and 44. Since the heating power within each zone is equal to $$\frac{V^2}{R_{TOTAL}},$$

the thermal work will be focused within the high heating zone 50.

Figure 3:
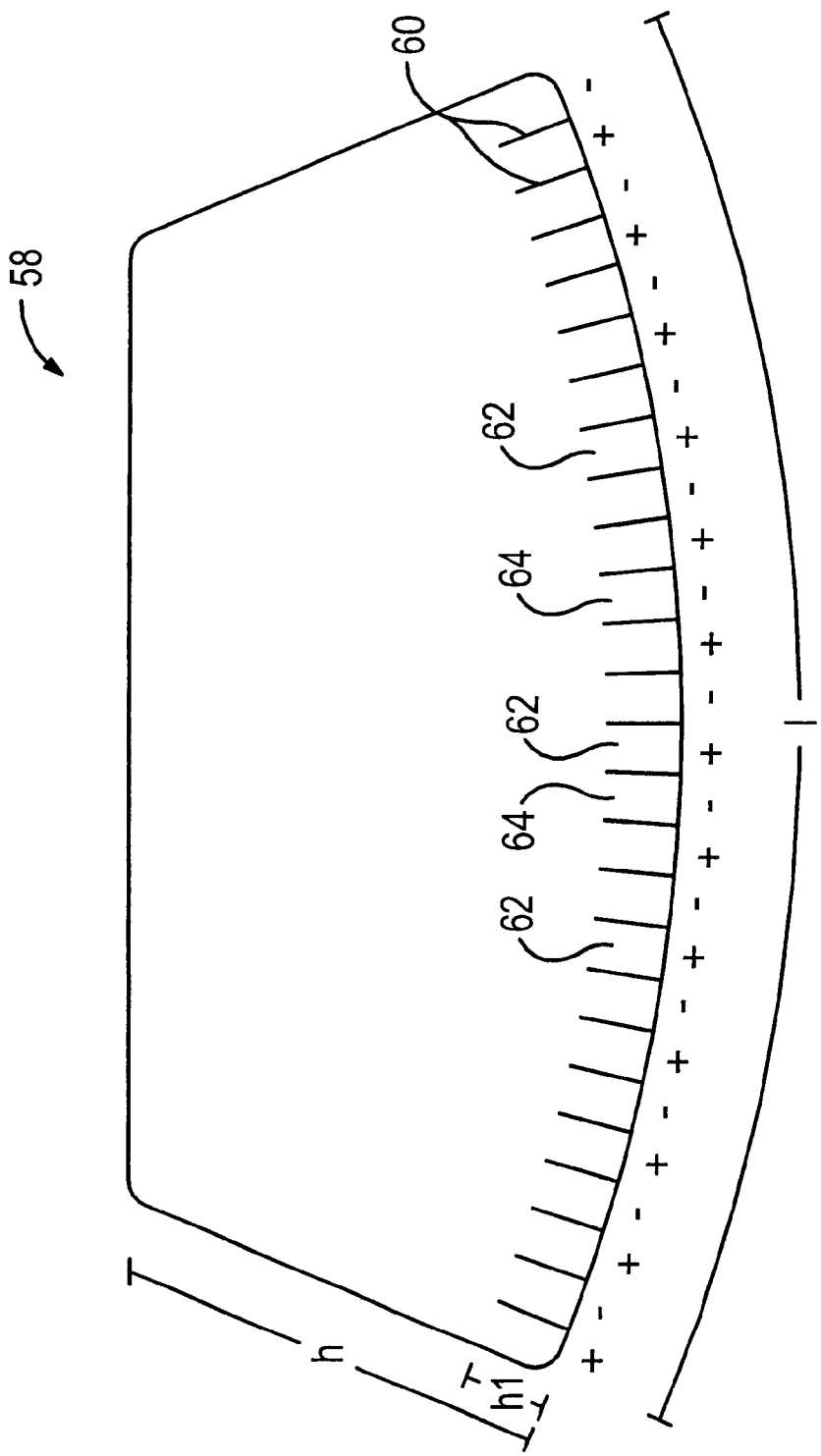
FIG. 3 is a front view of a vehicle windshield in accordance with another embodiment of the invention.

A third application of the invention is shown in FIG. 3. A front windshield 58 of a vehicle has a sequence of isolation traces 60 that extend upwardly from the bottom of the windshield. The upwardly extending isolation lines divide the bottom area of the windshield into high heating zones that are coupled to positive and negative voltage bus connections. The region above the ends of the isolation traces may be referred to as the low heating zone, since current will take the shortest paths between the positive and negative bus connections.

In FIG. 3, the sequence of polarity signals indicates that the positive voltage zones 62 and the negative voltage zones 64 alternate and that they extend along the entire lengthwise direction of the windshield 58. However, neither of these features is critical. The zones 62 and 64 may be limited to the areas in which windshield wipers reside when in a park condition. Moreover, it is not critical that the lengthwise dimensions of the zones remain constant. There may be applications in which variations in the length-wise dimensions and/or the heights of the zones provide benefits.

The height ($h_1$) of the isolation traces 60 is a small fraction of the height (h) of the windshield 58. Merely as an example, if the height of the isolation traces is one tenth of the total windshield height, the power that is used to de-ice the zones 62 and 64 would be equivalent to the power required to provide top-to-bottom heating for a windshield having one fifth the height and one half the length. Thus, the power density demands of the de-icing system are manageable.

Figure 4:
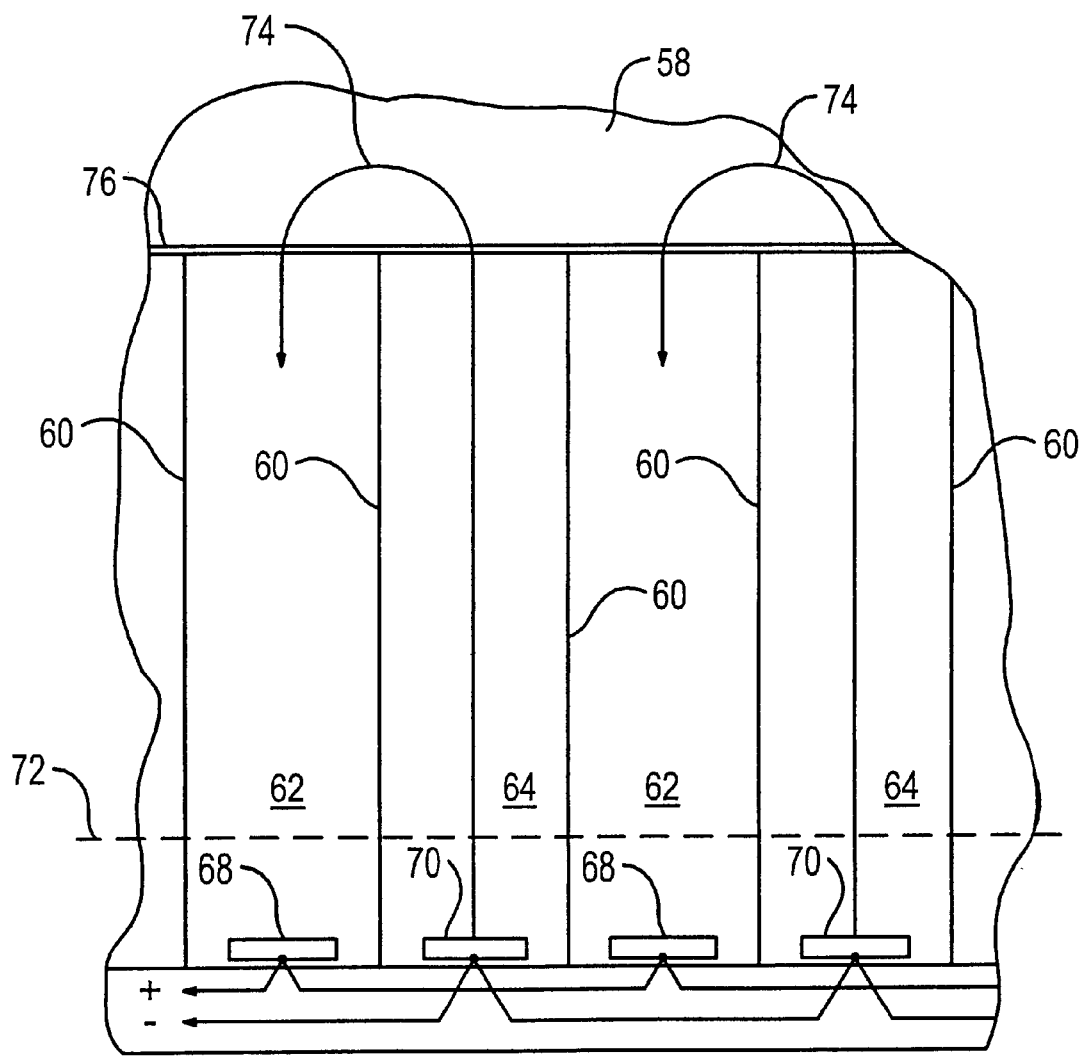
FIG. 4 is a partial view of bus connections to the vehicle windshield of FIG. 3.

Referring now to FIGS. 3 and 4, positive voltage bus connections 68 and negative voltage bus connections 70 are attached to the optically coated windshield 58 at positions below a sightline 72. Thus, the bus connections are preferably out of the line of vision of an occupant of a vehicle to which the windshield is mounted. Both bus polarities are coupled to the same edge of the laminate, with the isolation traces 60 separating regions of the coating such that current is driven up one region and down the adjacent region, as indicated by arrows 74. The configuration shown in FIGS. 3 and 4 is particularly suitable for windshield heating to assist in wiper release from icing and snow buildup, but may be used in other situations.

There are concerns that simple termination of the isolation traces 60 will result in a zone of high power at the ends of the traces. If the power level is too high, the coating and/or the substrate (e.g., PET) may be damaged. One technique for reducing the undesirable power concentration is shown in FIG. 4. A conductive element 76 is added. The conductivity of the element 76 is greater than the conductivity of the optical coating and it is therefore able to handle a greater current flow without overheating. That is, the additional conductive path provided by the element reduces the voltage gradient at the endpoints of the traces, so that power concentration is reduced.

Figure 5:
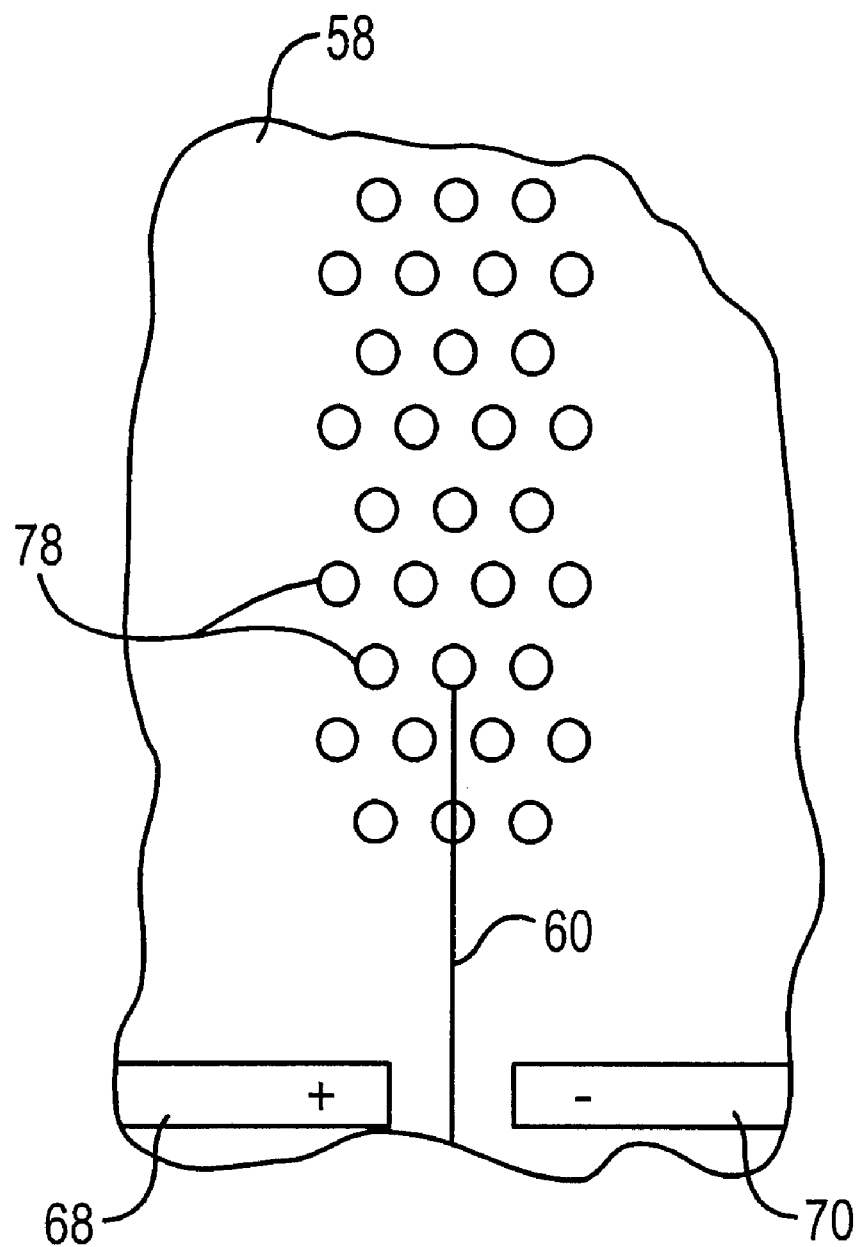
FIG. 5 is a front view of an optically coated window having coating patterning to reduce the likelihood that excessive current will cause damage to either the coating or the underlying substrate.

Another approach to reducing the power concentration at the trace ends is to increase the average electrical resistance at the ends of the isolation traces 60. As a result, the voltage differentials around the trace ends will be reduced. In FIG. 5, the average electrical resistance has been increased by removing spots 78 of coating. Additionally, the end of the isolation trace has been radiused. A similar approach may be used at the ends of the vertical traces 46 and 48 of FIG. 2.

The advantage of the configuration of FIGS. 3–5 is that high heating zones 62 and 64 are provided with short bus-to-bus dimensions, so that the high heating zones are effectively "isolated" from the large percentage of the conductively coated windshield. On the other hand, in the configuration of FIGS. 1 and 2, the bus-to-bus dimension is significantly greater, but the heating power is concentrated within the central zone 26. In both configurations, the localized heating of laminated glass is efficiently carried out at a relatively low voltage, such as the voltage provided by the conventional automobile battery, i.e., 14 Vdc.

Experimental Details

In testing the effectiveness of the invention, two identical lab samples were constructed. Both samples were 8 inches by 10 inches (i.e., 203.2 millimeters by 254 millimeters) and both used single-strength tempered glass. The test coating was a heatable film comprised of a PET substrate with a thickness of 50.8 microns and an optical coating of the type sold by Southwall Technologies, Inc. under the trademark XIR75Plus. Sputtered silver bus material was used for the interface material to the bus connections. The bus connections were approximately 1 inch (25.4 millimeters) wide copper tape. The heatable construction merely represents one preferred construction for heatable laminates.

The isolation traces were formed using an electric scribing technique. The resulting scribed lines were areas of no conductivity and were approximately 50 microns in width. Thus, the scribed lines served as high electrical resistance paths to shunt current along desired routes. The scribed lines were terminated with radiused scribed lines with electrically inactive zones inside, such as is shown in FIG. 5.

Both of the samples were assembled and then de-aired in vacuum bags. After an autoclave cycle, the laminate was prepared for tests by applying 30 Vdc between adjacent zones at the bus. The application of the 30 Vdc was continued for several seconds in order to ensure the isolation of adjacent bus connections. The relatively high voltage was intended to thermally destroy any whisker-like electrical connections that may have existed between the adjacent zones. The samples were then powered at normal voltage (approximately 14 Vdc) for a 24 hour period.

Measurements of Samples

Prior to the vacuum de-air, electrical conductivity between individual connections and the film was verified using a conventional ohmmeter. Slight pressure was applied along the bussed edge. After vacuum de-air and before autoclave, bus-to-bus resistances were verified for circuit integrity. After autoclave and the residual trace cleanup operation, bus-to-bus resistances were again measured. The measurement indicated a resistance of approximately 25 ohms each.

One of the samples was subjected to a progressive electrical heating test. The sample was powered at 2 Vdc for one hour to verify quality of the film-to-bus connection. The sample was then powered in 2 Vdc increments up to a maximum of 14 Vdc. Localized temperatures were monitored with an infrared sensor having a spot diameter of 0.25 inches (6.35 millimeters). The results of the monitoring of the localized temperatures indicated that the sample operated as expected. Tests on the other sample provided no reason to doubt the effectiveness of the heating localization.

What is claimed is:

1. A method of heating a localized region of a vehicle window comprising:

providing a generally transparent electrically conductive coating over substantially an entirety of a viewable coated portion of said vehicle window that is exposed when said vehicle window is mounted in a vehicle, while providing isolation traces in said conductive coating so as to divide said viewable coated portion into low-current and high-current regions and while providing patterning through said conductive coating at localized areas in which one of said low-current regions transition to one of said high-current regions, thereby achieving an increase in average resistance in said localized areas that are immediately adjacent to a region-to-region transition; and coupling a power source to said conductive coating such that electrical current is induced to flow among said high-current and low-current regions of said viewable coated portion, thereby achieving selective heating of said high-current regions relative to said low-current regions of said viewable coated portion;

wherein said vehicle window is a windshield of said vehicle, said isolation traces being formed along a bottom of said windshield such that an area in which windshield wipers reside is heated by coupling said power source to said conductive coating, said providing said isolation traces including forming electrically non-conductive lines that define a series of said high-current regions along said bottom of said windshield, said localized areas having said increase in average resistance being immediately adjacent to ends of said electrically non-conductive lines.

2. The method of claim 1 wherein:

forming said electrically non-conductive lines includes removing said conductive coating such that said electrically non-conductive lines extend generally upwardly to separate positive and negative said high-current regions; and coupling said power source includes connecting a positive bus connection to each said positive high-current region and connecting a negative bus connection to each said negative high-current region.

3. The method of claim 2 further comprising forming an added conductive element at upper ends of said non-conductive lines to inhibit excessive current flow adjacent to said upper ends.

4. The method of claim 2 wherein coupling said power source includes placing said positive and negative bus connections on said vehicle window in positions outside of said viewable coated portion that is exposed.

5. The method of claim 1 wherein said isolation traces are formed to achieve a desired pattern of heating power density variations within said viewable coated portion of said vehicle window, including establishing a first zone of high heating power density between two second zones of low heating power density, said first zone being said high current region, said second zones being said low-current regions.

6. The method of claim 5 wherein forming said desired pattern includes locating said first zone such that said first zone is substantially surrounded by said low-current regions.

7. The method of claim 5 wherein coupling said power supply includes forming first and second frits on a bottom of said vehicle window below said viewable coated portion, said first frit being a positive bus connection and said second frit being a negative bus connection.

8. A window comprising:

a transparent member having an exposed area;

an electrically conductive coating on substantially the entirety of said exposed area, said coating being generally transparent, said coating including first patterning that establishes a preselected heating power density pattern within said exposed area, said preselected heating power density pattern including a plurality of high heating zones and at least one low heating zone, said high heating zones being in a side-by-side relationship within said exposed areas of said transparent member, said coating further including second patterning in areas of abrupt transitions between said high and said low heating zones to provide localized areas of increased resistivity aligned with at least some of said abrupt transitions; and power connections coupled to said coating such that electrical current is induced to flow through each said high heating zone and through said localized areas of increased resistivity in flowing from one of said low heating zones to one of said high heating zones.

9. The window of claim 8 wherein said power connections are coupled to said high heating zones to provide negative and positive high heating zones, wherein current flows between said negative and positive high heating zones.

10. The window of claim 8 wherein said coating is divided into said high and low heating zones by isolation lines of removed coating, said preselected heating power density pattern being such that said current flows between said high and low heating zones, said second patterning being a selective removal of said coating at ends of said isolation lines to increase sheet resistance within said localized areas.

11. The window of claim 10 wherein said coating and said power connections are cooperative to provide a current flow from a first low heating zone to a first high heating zone and from said first high heating zone to a second low heating zone.

12. The window of claim 11 wherein said power connections are negative and positive voltage connections respectively coupled to said first and second low heating zones.

13. The window of claim 8 wherein said preselected heating power density pattern is defined by isolation lines of removed coating, said window further comprising added conductive elements at ends of at least some of said isolation lines to inhibit excessive current adjacent to said ends.

14. The window of claim 8 wherein said preselected heating power density pattern is defined by isolation lines of removed coating, said coating including said second patterning adjacent to at least some ends of said isolation lines so as to increase sheet resistance, thereby inhibiting excessive current adjacent to said ends.

15. A window comprising:

a transparent member having an exposed area;

an electrically conductive coating on substantially the entirety of said exposed area, said coating being generally transparent, said coating including patterning that establishes a preselected heating power density pattern within said exposed area, said preselected heating power density pattern including at least one high heating zone and at least one low heating zone, said preselected heating power density pattern being defined by isolation lines of removed coating;

power connections coupled to said coating such that electrical current is induced to flow through each said high heating zone; and added conductive elements at ends of at least some of said isolation lines to inhibit excessive current adjacent to said ends.

16. A method of heating a localized region of a vehicle window comprising:

providing a generally transparent electrically conductive coating over substantially an entirety of a viewable coated portion of said vehicle window that is exposed when said vehicle window is mounted in a vehicle, while providing isolation traces in said conductive coating so as to divide said viewable coated portion into low-current and high-current regions;

coupling a power source to said conductive coating such that electrical current is induced to flow among said high-current and low-current regions of said viewable coated portion, thereby achieving selective heating of said high-current regions relative to said low-current regions of said viewable coated portion;

wherein said vehicle window is a windshield of said vehicle, said isolation traces being formed along a bottom of said windshield such that an area in which windshield wipers reside is heated by coupling said power source to said conductive coating, said providing said isolation traces including forming electrically non-conductive lines that define a series of said high-current regions along said bottom of said windshield, including removing said conductive coating such that said electrically non-conductive lines extend generally upwardly to separate positive and negative said high-current regions, said coupling of said power source including connecting a positive bus connection to each said positive high-current region and connecting a negative bus connection to each said negative high-current region; and forming an added conductive element at upper ends of said non-conductive lines to inhibit excessive current flow adjacent to said upper ends.

\* \* \* \* \*